(12) United States Patent
Knight

(10) Patent No.: US 10,183,608 B2
(45) Date of Patent: Jan. 22, 2019

(54) TOWABLE ACCOMMODATION UNIT

(71) Applicant: Huntian Pty Ltd, Lyndoch (AU)

(72) Inventor: James Gerard Knight, Lyndoch (AU)

(73) Assignee: Huntian Pty Ltd (AU)

( * ) Notice: Subject to any disclaimer, the term of this patent is extended or adjusted under 35 U.S.C. 154(b) by 0 days.

(21) Appl. No.: 15/599,689

(22) Filed: May 19, 2017

(65) Prior Publication Data
US 2017/0341562 A1 Nov. 30, 2017

(30) Foreign Application Priority Data

May 31, 2016 (AU) ................................ 2016902090

(51) Int. Cl.
| B60P 3/32 | (2006.01) |
| B60P 3/34 | (2006.01) |
| E04B 1/343 | (2006.01) |
| E04H 15/06 | (2006.01) |

(52) U.S. Cl.
CPC . B60P 3/34 (2013.01); *B60P 3/32* (2013.01); *E04B 1/343* (2013.01); *E04H 15/06* (2013.01)

(58) Field of Classification Search
CPC .................. B60P 3/34; B60P 3/32; B60P 3/06
USPC ............................................... 296/26.09, 153
See application file for complete search history.

(56) References Cited

U.S. PATENT DOCUMENTS

| 2,457,581 A * | 12/1948 | McCain ................... B60P 3/34 296/171 |
| 2,653,049 A * | 9/1953 | Mettetal, Jr. ............. B60P 3/08 410/28.1 |
| 3,351,373 A * | 11/1967 | Christin .................... B60P 3/32 135/116 |
| 3,556,581 A * | 1/1971 | Da Silva .................... B60P 3/34 296/173 |
| 3,866,365 A * | 2/1975 | Honigman ............ E04B 1/3444 52/66 |
| 4,114,942 A * | 9/1978 | Greiner .................... B60P 3/34 296/172 |
| 5,090,749 A | 2/1992 | Counsel |
| 6,283,537 B1 * | 9/2001 | DeVore, III ............. B60P 3/341 296/168 |
| 6,447,038 B1 * | 9/2002 | Davis ..................... B60J 7/1614 280/414.1 |
| 6,736,446 B1 * | 5/2004 | Johnson ................... B60P 3/36 296/162 |

(Continued)

FOREIGN PATENT DOCUMENTS

WO WO-2009112719 A2 * 9/2009 ................ B60P 3/34

*Primary Examiner* — Pinel E Romain
(74) *Attorney, Agent, or Firm* — Sand & Sebolt

(57) ABSTRACT

There is proposed a towable expandable accommodation or storage assembly that includes a floor portion that is affixed to or supported on a drawbar, wherein an expansion portion is configured to be pivoted to one side of said floor portion to form at least one wall when the assembly is being used for the purpose of accommodation or utility. The assembly may provide a collapsible ablutions cubicle or kitchen area that can be reduced in size during transportation of the assembly. In this way, the assembly can be towed to a site and expanded to provide an expanded living area. Furthermore, the configuration of the floor portion means that grey water can be captured for the ablutions cubicle or kitchen area for storage in a tank or to be directed to a drain.

20 Claims, 12 Drawing Sheets

(56) References Cited

U.S. PATENT DOCUMENTS

| | | | | |
|---|---|---|---|---|
| 7,410,205 B2* | 8/2008 | Cardwell | ............... | B60P 3/36 |
| | | | | 296/162 |
| 7,686,381 B1* | 3/2010 | Leonard | ............... | B60P 3/343 |
| | | | | 296/162 |
| 7,841,645 B2* | 11/2010 | Diamond | ............... | B60P 3/34 |
| | | | | 108/44 |
| 7,967,369 B2* | 6/2011 | Davidson | ............. | B60P 3/341 |
| | | | | 296/173 |
| 8,528,962 B2* | 9/2013 | Wilkie | ................. | B60P 3/36 |
| | | | | 296/162 |
| 9,193,292 B2* | 11/2015 | Peck | .................. | B60P 3/341 |
| 9,597,993 B2 | 3/2017 | Pellicer | | |
| 9,834,127 B2* | 12/2017 | Caulder | ............... | B60P 3/07 |
| 2008/0211259 A1* | 9/2008 | Nadeau | ............... | B60P 3/34 |
| | | | | 296/173 |
| 2012/0261902 A1* | 10/2012 | Graber | ................ | B60P 3/32 |
| | | | | 280/433 |

* cited by examiner

TOWABLE ACCOMMODATION UNIT

FIELD OF THE INVENTION

The present invention relates generally to trailers and in one aspect relates to a towable accommodation or storage assembly including an expandable portion.

BACKGROUND OF THE INVENTION

There are numerous configurations of trailers and caravans current on the market that provide portable accommodation or that provide the means for transporting equipment, such as tents, recreation vehicles and boats. Towable accommodation in the form of camper trailers, caravans, campers, towable RVs and tent trailers are widely used in Australia and the USA.

There are also trailers that allow for the transportation of recreational vehicles, such as quad bikes, which also include a sleeping cubicle or sealed compartment for storing bedding.

All of these types of trailers or mobile accommodation units, typically comprise a chassis supported on wheels connected to a respective axle or independent suspension, a drawbar connectable to a towing vehicle and a body fixedly attached to the chassis.

Many of the trailers and caravans currently on the market include awnings that are configured to provide additional covered living space. Furthermore, there are a number of caravans and campers that include expandable body portions to provide an enlargeable internal living space such as the units disclosed in U.S. Pat. No. 5,090,749 to Counsel, and U.S. Pat. No. 9,597,993 to Pellicer. These expandable body portions typically include a slidable portion that can be slid outwardly when on site and then stored away during transport.

Existing expandable body portions are however typically configured to retract into the internal space of the caravan or camper trailers, which means that they can impinge upon the existing structures within the caravan or can make packing of the trailer or caravan problematic.

En-suite caravans have become popular in recent times. However, such caravans are typically larger in length thereby affecting off-road ability and requiring the towing vehicle to have sufficient towing capacity. Alternatively, an en-suite tent can be attached to a side of a camper trailer or caravan, however these typically cannot be accessed from the interior of the tailer or caravan and accordingly lack privacy. Furthermore, such en-suite tents cannot be used at many caravan or trailer park sites since they do not capture or at least direct the grey water in a controlled fashion.

The phase 'towable accommodation or storage assembly' used throughout the specification should be understood to include any type of towable vehicle including, but not limited to, on-road camper trailers, on-road caravans, off-road camper trailers, off-road caravans, tent trailers, RV's, motorhomes, haulage trailers, mobile homes, caravanettes, goods trailers, flatbed trailers, tradesman trailers, storage trailers, car carriers, boat trailer, horse floats or any other type of towable vehicle having a drawbar.

It should be appreciated that any discussion of the prior art throughout the specification is included solely for the purpose of providing a context for the present invention and should in no way be considered as an admission that such prior art was widely known or formed part of the common general knowledge in the field as it existed before the priority date of the application.

SUMMARY OF THE INVENTION

It could be broadly understood that the invention resides in a towable accommodation or storage assembly that includes a floor portion that is affixed to or supported on a drawbar, wherein an expansion portion is configured to be pivoted to one side of said floor portion to form at least one wall when said assembly is being used for the purpose of accommodation or utility.

In one aspect of the invention, but not the broadest or only aspect there is proposed a towable accommodation or storage assembly including, a chassis supported on at least two wheels connected to a respective axle or independent suspension, a drawbar, and a body generally rigidly mounted to said chassis, the towable accommodation or storage assembly being towable behind a towing vehicle, the body having spaced apart first and second sidewalls, a rear wall extending therebetween, a roof attached to upper parts of said sidewalls and rear wall, and a main floor attached to lower parts of said sidewalls and rear wall, an expansion portion, pivotably mounted to, or adjacent a generally vertical front edge of the first sidewall and pivotable to abut a generally vertical front edge of said second sidewall, a fixed first floor portion adjoining or extending outwardly of said main floor, and a movable second floor portion attached to or adjacent the first floor portion and supportable on or above said drawbar, wherein said expansion portion is configured to pivot about a generally vertical axis from a first position wherein the expansion portion abuts or is positioned adjacent said vertical front edge of the second sidewall and covers at least a part of the first floor portion, and a second position wherein at least a part of the first floor portion is exposed and said second floor portion is supported in a generally horizontal orientation on or above the drawbar to thereby provide at least a part of an expanded floor for an expanded living space and the expansion portion forms at least a first side wall of said expanded living space.

In one form the expanded floor of the expanded living space comprises the first floor portion that is fixed to the chassis or drawbar, and the second floor portion that is hingedly attached to a front edge of the first floor portion and pivotable about a horizontal axis between a generally vertical or oblique orientation and a generally horizontal orientation wherein it is configured to be supported on an upper surface of said drawbar.

Preferably the expansion portion completely overlays the first floor portion when in said first position, to seal the first floor portion from the ingress of dust. An underside of the expansion portion may include seals to inhibit the ingress of dust and sliders, rollers or wheels to assist in the movement of the expansion portion over said first and/or second floor portions.

In one form the body may include a front wall that encloses the body to define an internal living or storage space. The front wall may include a door to permit access to the internal living or storage space. In another form the body may include an open front or a movable partition wall. Alternatively, the body may include or comprise a rear flatbed or box tray, or the rear wall of the body may include or comprise a door for accessing the internal living or storage space The towable accommodation or storage assembly could therefore be broadly understood to comprise an internal living or storage space at least partially delineated by the body, and an expanded living space that is at least partially delineated by the expansion portion and the expanded floor.

The front wall of the body or a portion thereof may be movable when the expansion portion is in said second position or between the first and second positions, to permit access between the expanded living space and the internal living or storage space.

In one form, generally rigid panels are used to form a roof, front wall and second side wall of the expanded living space. The panels are secured in place by relevant clamps, clips or temporary fixing means. The panels that form the roof and walls may be hingedly or slidably attached to the body. In one form the roof panel slidably engages the roof of the body wherein it can be extended when the expansion portion is in the second position.

In another form, at least some of the walls and/or roof of the expanded living space are constructed from a flexible material, such as but not limited to canvas, PVC or ripstop nylon, wherein zips, elastic cords, press studs, or strips of hook and loop fasters are used to hold the flexible material in place.

In another form an awning, tunnel tent or gusset may be used to connect the expanded living space to a rear internal space of said towing vehicle. The awning, tunnel tent or gusset may be connected to, or extends over, a rear of said towing vehicle.

The walls and/or roof of the expanded living space may include a foldable frame wherein as the expansion portion is opening the frame folds out from a storage position to form the walls and/or roof. This automatic deployment of the walls and/or roof may be used to reduce the time of setup. Alternatively, the flexible walls and/or roof may be manually retrieved from a storage cavity and may be clipped or otherwise secured in place. A removable pole/s or frame can be manually located in position in a similar fashion to the tent of some tent trailers.

The opening and closing of the expansion portion to provide the expanded living space may be undertaken by way of electric or mechanical assistance and include actuators, levers, pulleys, cables or any other necessary apparatus that are required to assist the user in moving the expansion portion. In one form the movement of the expansion portion may be completely automated with appropriate stops and override mechanisms to inhibit damage to any opening/closing apparatus.

The roof and walls of the expanded living space are configured to interconnect with each other and the expanded floor to thereby provide a generally enclosed expanded living space. The connection devices used to connect the roof and walls preferably provide a barrier to the ingress of water and dust, but in some forms may simply provide connection between the roof, walls and expanded floor without a weather seal to the surrounding environment.

In one form the fixed first floor portion and hinged second floor portion are generally planar and configured to be positioned on generally the same horizontal plane when being used for accommodation or utility purposes, i.e. kitchen, en-suite.

In another form the first and/or second floor portions includes at least one part that is sloped to permit drainage. Alternatively, the first and/or second floor portions may be slatted to permit movement of water therethrough into a sump or drain. In the immediately preceding forms the first and/or second floor portions are configured to act as shower base and includes a drainage hole or holes to be used to direct grey water into a detachable hose or a grey water tank.

The first and/or second floor portions may be rectangular or may conform to the shape of the drawbar and be generally triangular shaped. In the triangular configuration, the expansion portion will be configured to open to around 60° relative to a front vertical plane of the body, or any other suitable angle.

A movable internal panel attached to the expansion portion or a front portion of the body may be used to provide an internal sidewall for an ablutions cubicle containing a toilet and/or shower and/or basin.

In another form the internal panel is a bi-fold partition that includes two pivotable parts that are vertically connected and are positionable to form two walls of said ablutions cubicle.

Preferably the expansion portion includes storage compartments or facilities that can only be accessed from within the expanded living space. In one form the facilities may comprise a toilet, shower or sink with appropriate plumbing. The plumbing may include couplings for connection to a water source or dumping point. The couplings are preferably accessible from an exterior of the expansion portion and may include covers or caps to protect them when not in use.

In one form when the second floor portion is in a generally upright position it covers the external access points or couplings for the services i.e. power, gas or water couplings. The second floor portion may also be configured to cover a hot water system and/or water filtration system and/or storage area when in the upright position.

Preferably a door is located in at least one of said walls of the expanded living space to allow access thereto.

In one form a partition wall may be located between the expanded living space and the internal living or storage space of the body. The partition wall may be movable to fold out from an edge of the body or expansion portion. The partition wall may include a door therethrough or a void or voids to permit access between the expanded living space and the internal living or storage space of the body.

In another form, there is no barrier between the expanded living space and the internal living or storage space of the body, whereby the expanded living space provides an extension of the internal living or storage space of the body.

The body may provide a living space including at least one sleeping structure and the expansion portion may provide an expandable en-suite and/or kitchen space. An internal door is preferably used to separate the expandable en-suite from the living space.

The ablutions cubicle or en-suite may include movable walls wherein the size of the ablutions cubicle may be reduced by moving a wall or walls to access a part of the kitchen space or a storage area.

In another form, the expandable en-suite may be accessible from an exterior of the towable accommodation or storage assembly through an external door.

The expansion portion may provide cooking, preparation, eating, storage, sleeping and/or ablutions areas.

Preferably the hinged second floor portion acts as a stone guard when the towable accommodation or storage assembly is being towed and as a part of the expanded floor of the expanded living space when in an expanded arrangement.

The second floor portion is hingedly attached to or adjacent a forward edge of the fixed first floor portion. The hinged second floor portion is configured to hinge about a generally horizontal axis between an upright or angled position wherein it protects the expandable accommodation unit from damage by stones, and a lowered position wherein it is configured to rest generally horizontally on, or parallel with, the drawbar to thereby form part of the base of the expanded living space.

In another form, the second floor portion is slidably connected to or adjacent the first floor portion whereby it can be slid out of a stored position to be supported on or above the drawbar when the expansion portion is in the second position.

The expansion portion may be generally rectangular in its horizontal cross-sectional profile to thereby limit its footprint when in the first or folded position, whilst maximising the size of the expanded living space when the expansion portion is in the second or extended position.

Stabilising legs or struts may be used to support the hinged floor portion. Stabilising legs or struts may also support the expansion portion when in the first or open position. The legs or struts are preferably connected to the expansion portion and second floor portion, and can be pivoted or slid into place to support the respective structures. In another form, they may be reversibly attachable thereto.

Preferably the legs or struts are configured to engage a ground surface and may include feet or the legs, or the struts may be configured to engage receiving brackets on the chassis or drawbar.

Alternatively, the second floor portion may be supported completely on the drawbar and the expansion portion is supported on the first and/or second floor portions.

In another aspect of the invention there is proposed a method of providing an expandable portable living space, including the steps of: providing a towable accommodation or storage assembly including a chassis supported on at least two wheels connected to a respective axle or independent suspension, a drawbar for coupling to a towing vehicle for transportation thereof, a body generally rigidly mounted to said chassis, an expansion portion pivotably mounted to, or adjacent said body, and a floor portion or portions mounted to, or supported on, an upper surface of said drawbar; towing said towable accommodation or storage assembly with the expansion portion in a retracted position, to a lodging site; pivoting said expansion portion about a generally vertical axis into an extended position thereby exposing or positioning said floor portion or portions to provide an expanded floor for an expanded living space, the expansion portion forming at least one wall of said expanded living space; and attached or positioning a roof and walls in place to thereby at least partially enclose said expanded living space.

Preferably when in said retracted position the expansion portion abuts or is at least positioned adjacent a front of said body. The expansion portion may overlay a part of said floor portion or portions.

BRIEF DESCRIPTION OF THE DRAWINGS

The accompanying drawings, which are incorporated in and constitute a part of this specification, illustrate an implementation of the invention and, together with the description and claims, serve to explain the advantages and principles of the invention. In the drawings.

FIG. 11 is a perspective view of the towable accommodation or storage assembly of FIG. 10, illustrating the front boot open and the stone guard/second floor portion lowered to reveal a lower storage/couplings/services area;

DETAILED DESCRIPTION

Figure 1:
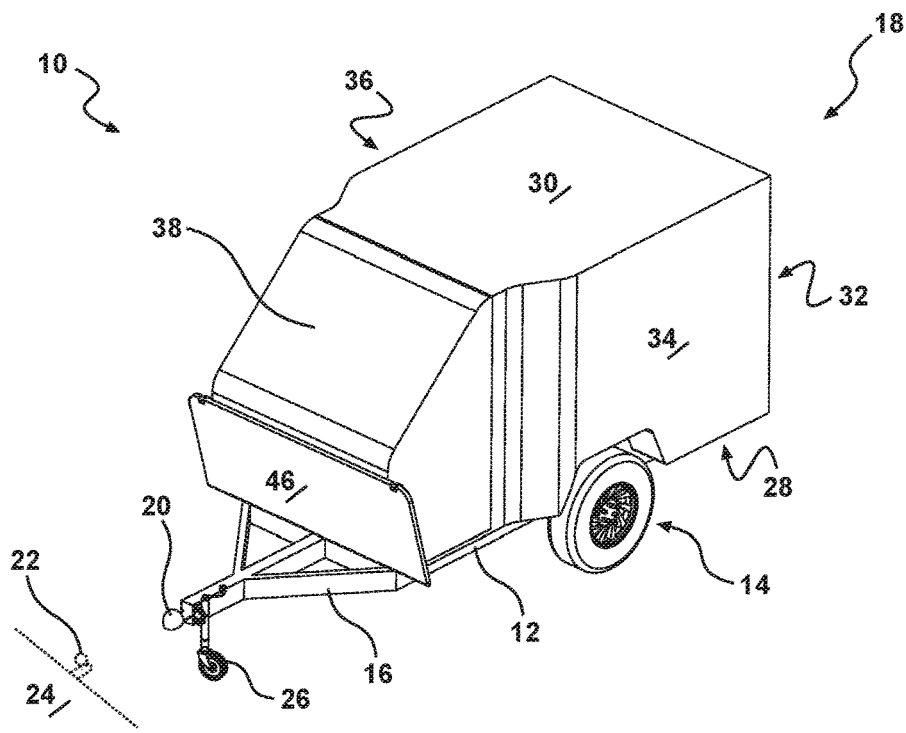
FIG. 1 is a perspective view of a first embodiment of the towable accommodation or storage assembly illustrating an expansion portion in a retracted or closed position.

Similar reference characters indicate corresponding parts throughout the drawings. Dimensions of certain parts shown in the drawings may have been modified and/or exaggerated for the purposes of clarity or illustration.

Referring to the drawings for a more detailed description, there is illustrated a towable accommodation or storage assembly 10, demonstrating by way of examples, arrangements in which the principles of the present invention may be employed.

FIG. 1 illustrates the towable accommodation or storage assembly 10 including a chassis 12 supported on at least one wheeled axle 14, a drawbar 16, and a body 18 rigidly mounted to the chassis 12. The drawbar 16 includes a hitch 20 for connection to a tow ball 22 of a towing vehicle 24. The drawbar 16 further includes a jockey wheel 26. The reader will appreciate that the wheeled axle may alternatively be independent suspension.

The body 18 includes a main floor 28 spaced apart from a main roof 30 with a rear wall 32 and opposing sidewalls 34, 36 extending therebetween.

The towable accommodation or storage assembly 10 further includes an expansion portion 38 that in the present embodiment is pivotably mounted to sidewall 36 by way of a vertically extending hinge 40. When in the closed of retracted position as illustrated in FIG. 1 the expansion portion 38 is positioned over a fixed first floor portion 42. It should be appreciated that the fixed first floor portion 42 may be integral with the main floor 28, as illustrated in FIG. 3, or may be separate to and abutting a front edge of the main floor 28.

Figure 2:
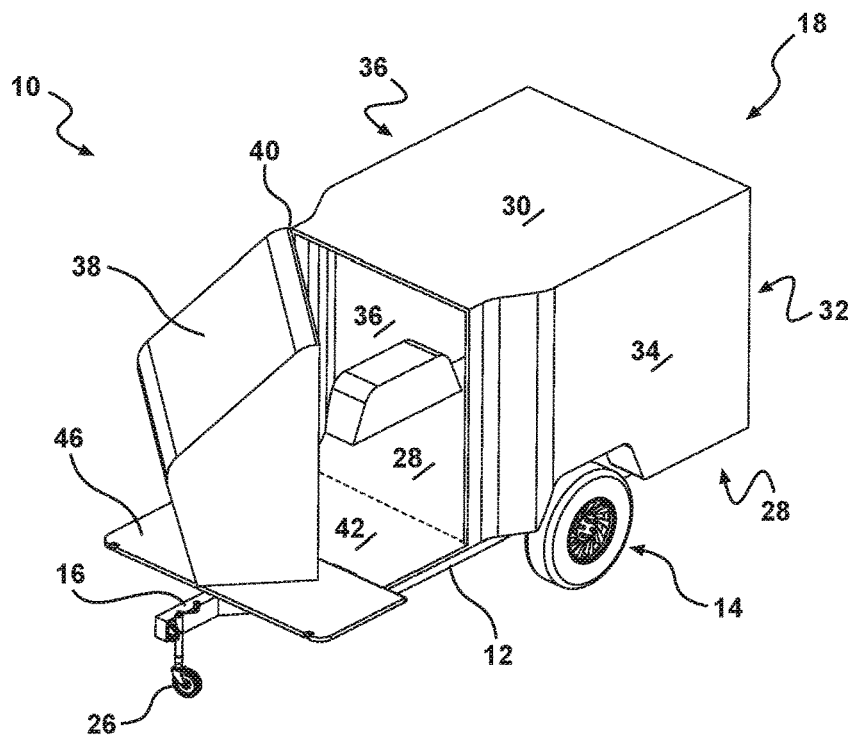
FIG. 2 is a perspective view of the towable accommodation or storage assembly of FIG. 1 illustrating the expansion portion in an intermediate position.
Figure 3:
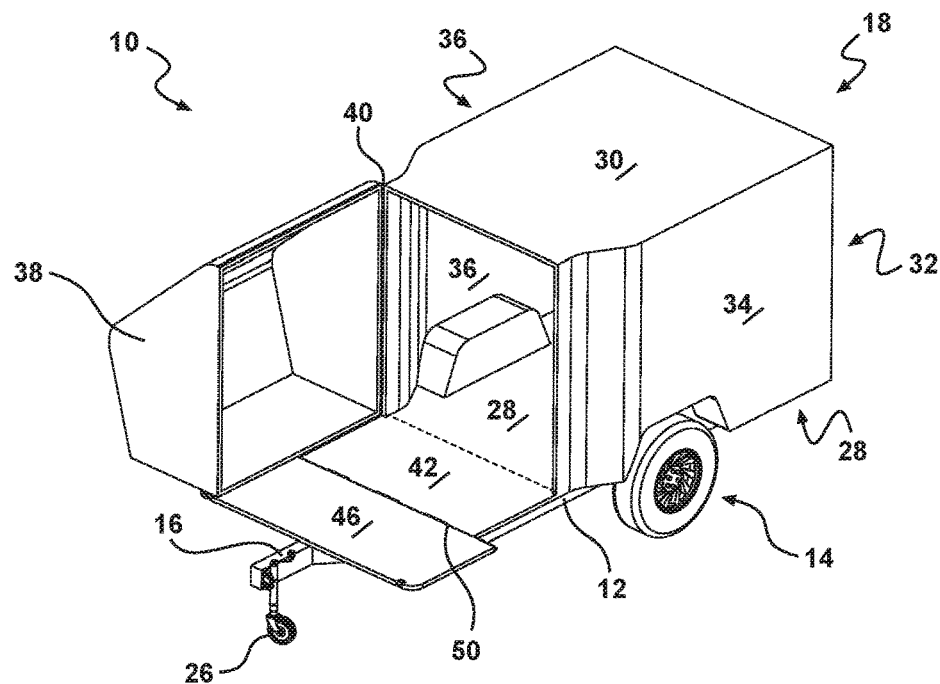
FIG. 3 is a perspective view of the towable accommodation or storage assembly of FIG. 1 in an extended or open position.
Figure 4:
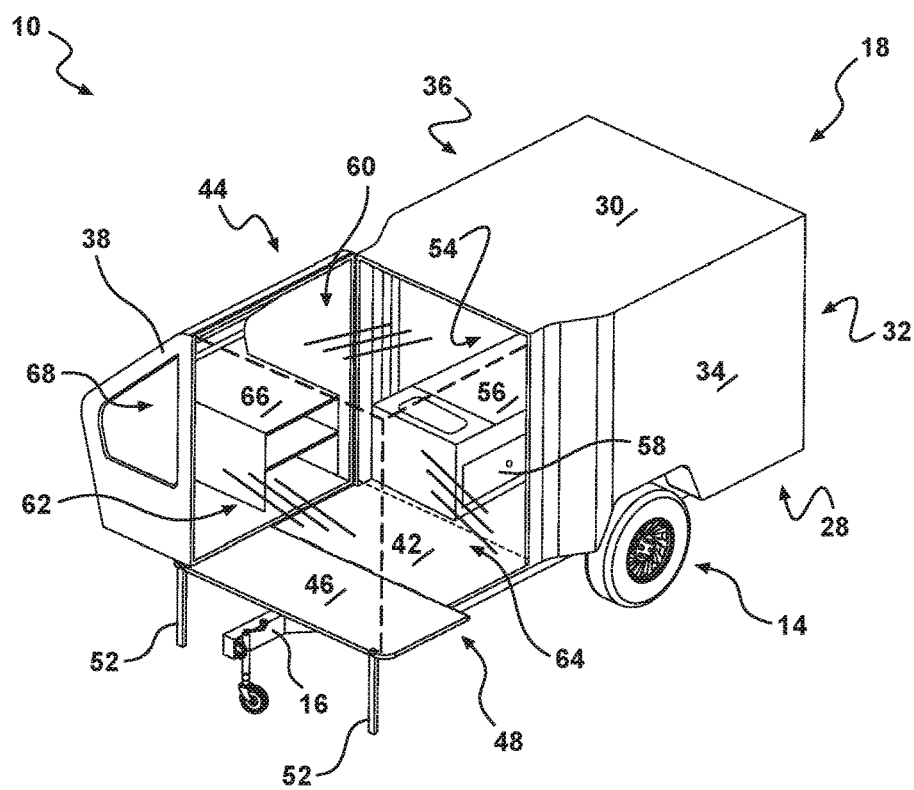
FIG. 4 is a perspective view of a second embodiment of the towable accommodation or storage assembly illustrating in doted lines the walls and roof of the expanded living space.

The expansion portion 38 is configured to pivot about a generally vertical axis from a first or retracted position as illustrated in FIG. 1, through an intermediate position, as illustrated in FIG. 2, to a second or extended position, as illustrated in FIG. 3, to thereby provide an expanded living space 44 as illustrated in FIG. 4.

The towable accommodation or storage assembly 10 includes a hinged second floor portion 46 that in an upright or slanted position may act as a stone guard. The second floor portion 46 is pivotable between an inclined position as illustrated in FIG. 1 wherein it protects the front of the towable accommodation or storage assembly 10 from damage by rocks and debris when being towed, and a generally horizontal position as illustrated in FIGS. 2 to 4. In the horizontal position the second floor portion 46 rests upon the drawbar 16 and an upper surface forms at least a part of the expanded floor 48 of the expanded living space 44.

The reader will now appreciate that the fixed first floor portion 42 and hinged second floor portion/stone guard 46 forms the expanded floor 48 of the expanded living space 44.

In the present embodiment, the second floor portion 46 is attached to a front edge of the first floor portion 42 by a horizontally extending hinge 50.

As illustrated in FIG. 4 the second floor portion 46 is supported on legs 52. These support legs 52 may be attached to or deployed from the second floor portion 46 to stabilise the towable accommodation or storage assembly 10 at the front outer corners. The reader should however appreciate that struts (not shown) that engage the drawbar may alternatively be used, or the second floor portion 46 may be sufficiently supported on the drawbar to not require legs or struts.

As further illustrated in FIG. 4, the main floor 28, main roof 30, rear wall 32 and opposing sidewalls 34, 36 of the body 18 define an internal living or storage space 54. This internal living or storage space 54 may include fixed structures, such as a bed 56, storage draws 58 or other structures typically found in caravans or campers.

The expanded living space 44 is enclosed by a roof 60, front wall 62 and sidewall 64, shown as transparent in FIG. 4 to illustrate the boundaries of the expanded living space 44.

The expansion portion 38 also includes fixed structures, such as shelves 66 and a window 68.

Figure 5A:
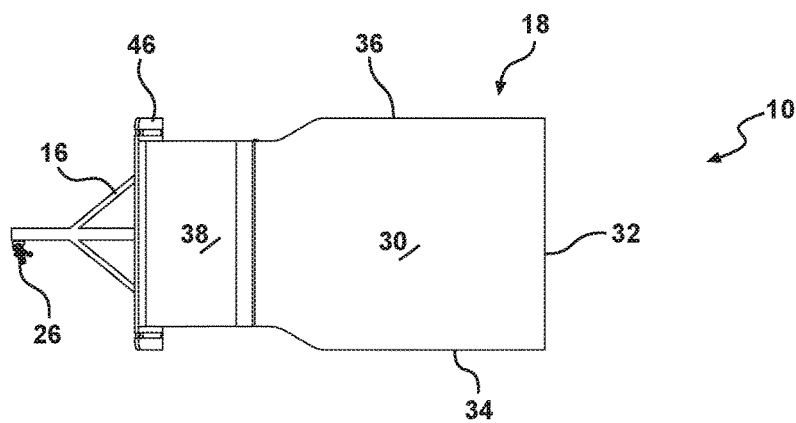
FIG. 5a is a top view of the towable accommodation or storage assembly of FIG. 1, illustrating the expansion portion in the retracted or closed position.
Figure 5B:
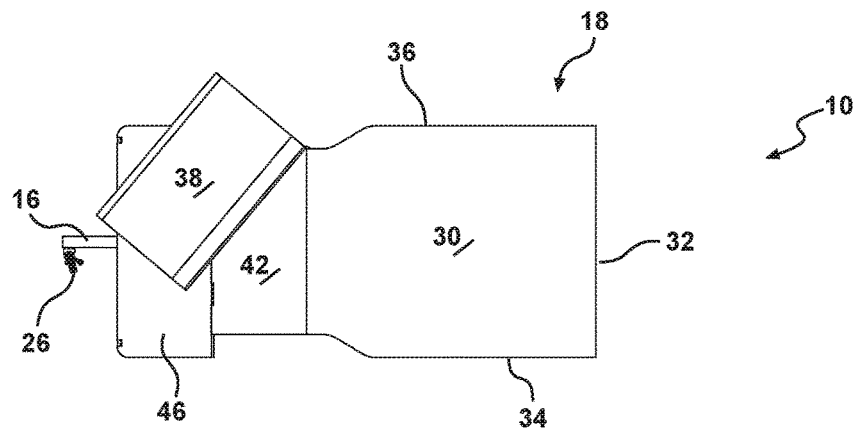
FIG. 5b is a top view of the towable accommodation or storage assembly of FIG. 2, illustrating the expansion portion in the intermediate position.
Figure 5C:
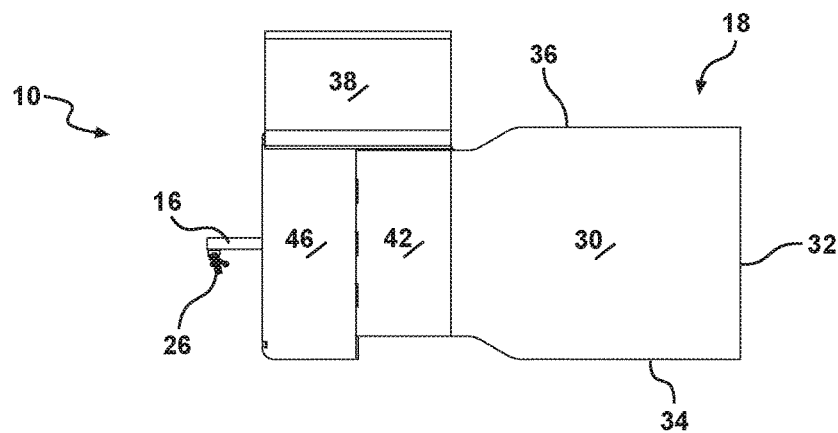
FIG. 5c is a top view of the towable accommodation or storage assembly of FIG. 3, illustrating the expansion portion in the extended or open position.

FIGS. 5a to 5c illustrate the expansion portion 38 being pivoted about a generally vertical axis into the expanded or open position. As shown in FIG. 5a, the expansion portion 38 is positioned in a first or retracted position when being towed behind a towing vehicle 24. When the towable accommodation or storage assembly 10 is to be used the expansion portion 38 is pivoted through a series of intermediate positions, one of which is illustrated in FIG. 5b, until it is in a second or extended position as illustrated in FIG. 5c, whereafter it is locked in place. Once in position the walls 62, 64 and roof 60 can be attached as previously illustrated in FIG. 4. The walls 62, 64 and roof 60 may be constructed from a canvas material or similar. Alternatively, the walls 62, 64 and roof 60 may be semi-rigid and removably attached in place or may comprise panels that are hingedly or slidably connected to the body 18 or expansion portion 38 and which may be pivoted or slid into place and locked with appropriate fixing means.

When in a closed or retracted position, as illustrated in FIG. 5a, during transit the expansion portion 38 covers and seals the floor area 42 beneath it and seals access to the internal living or storage space 54. Opening of the expansion portion 38 is supported and controlled in stages via interaction with the fixed first floor portion 42 beneath and also the second floor portion 46.

The reader should however appreciate that the opening and/or closing of the expansion portion may be undertaken by way of electric or mechanical assistance and include actuators, levers, pulleys, cables or any other necessary apparatus that are required to assist the user in moving the expansion portion, with appropriate stops and override mechanisms to inhibit damage to the apparatus.

A lower edge of the expansion portion 38 may include sliders, rollers and brush seals (not shown) to permit the smooth opening and closing thereof. When fully open, as illustrated in FIG. 5c, the outside corner of the expansion portion 38 is latched to the second floor portion 46 to provide horizontal and vertical support.

Figure 6:
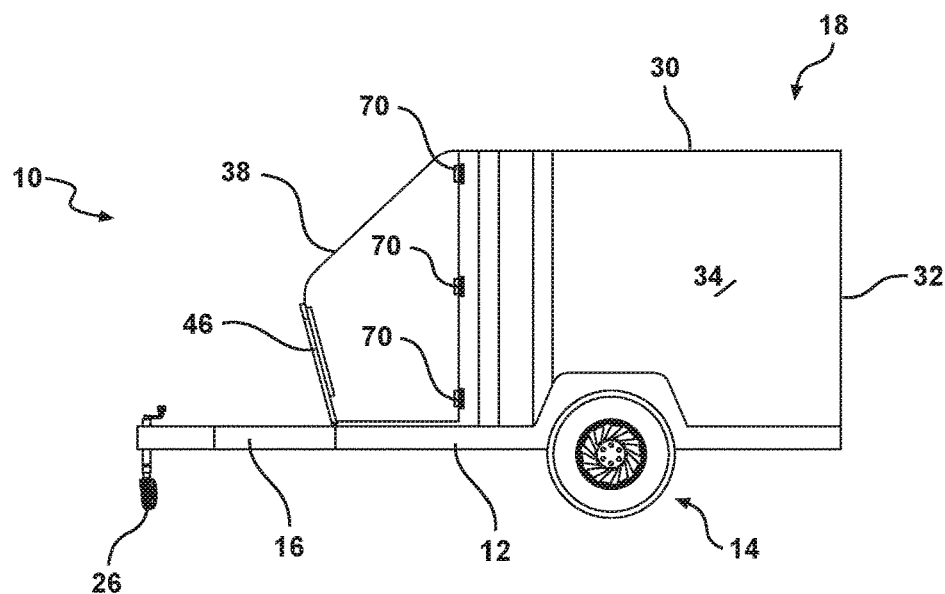
FIG. 6 is a side view of the towable accommodation or storage assembly illustrating the locking brackets.

As illustrated in FIG. 6 the expansion portion 38 is secured to the body 18 during transport by way of latches 70, with appropriate seals (not shown) to inhibit ingress of dust or moisture.

Figure 7:
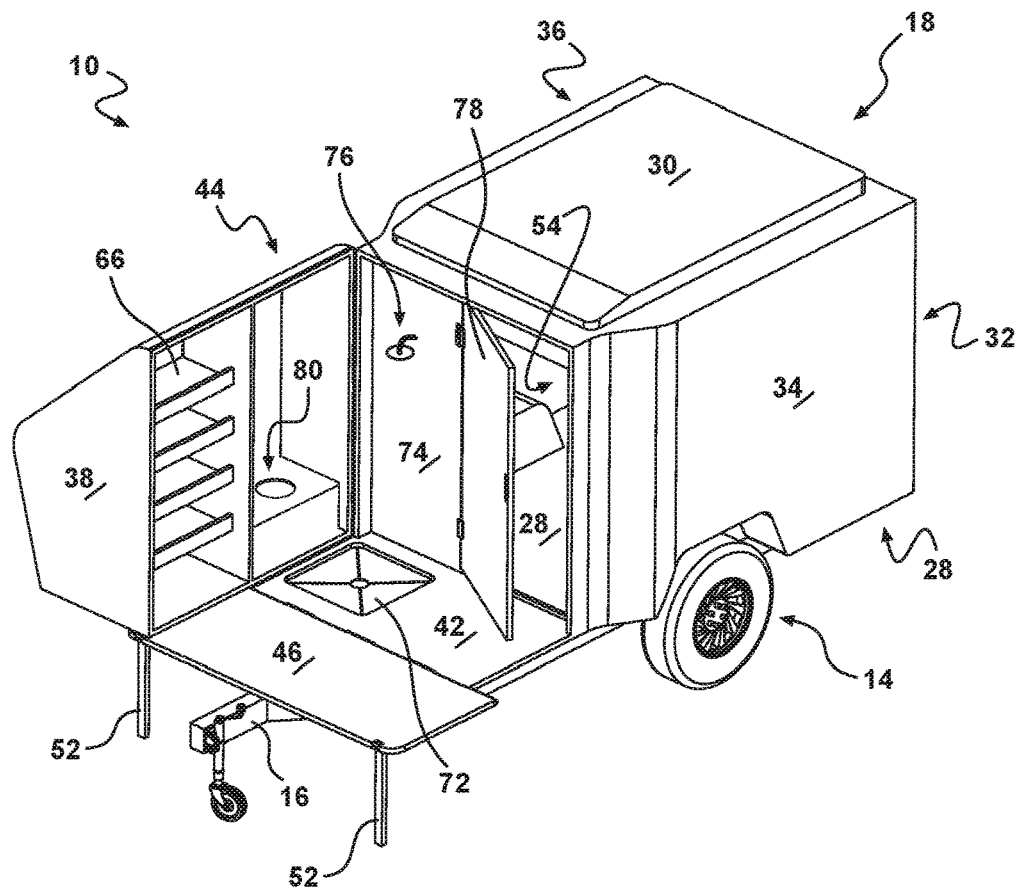
FIG. 7 is a perspective view of a third embodiment of the towable accommodation or storage assembly illustrating a wet area, internal partition wall and internal door.
Figure 9:
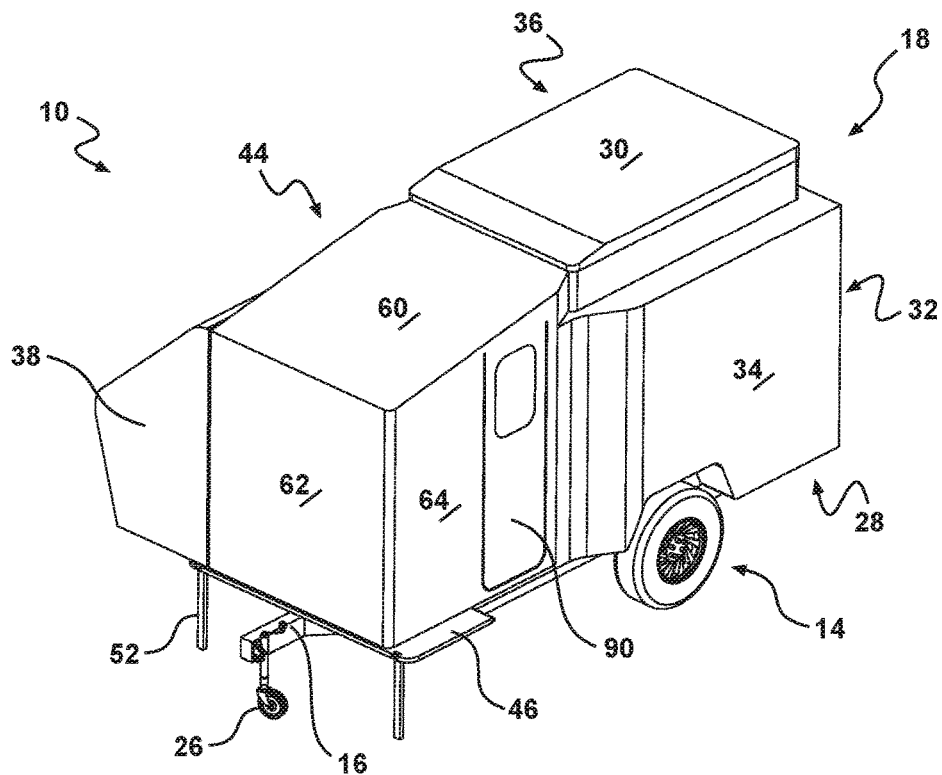
FIG. 9 is a perspective view of the towable accommodation or storage assembly of FIG. 7 in the fully expanded arrangement with the walls and roof attached.

The roof 30 or a portion thereof, may be raised from a lowered position as shown in FIG. 7 into a raised position as illustrated in FIG. 9. This is commonly referred to in the art as a pop-top configuration. As further shown in FIG. 7 the expanded living space 44 may be used as a wet area having a shower collection tray/drain 72 in the first floor portion 42 for collecting grey water. A fixed partition wall 74 separates a part of the expanded living space 44 from the internal living or storage space 54. In the present embodiment, the fixed partition wall 74 forms a rear side of the shower recess and is used to mount a showerhead 76 thereto. A pivoted wall portion 78 is configured to act as a sidewall for the shower or as a door between the expanded living space 44 and internal living or storage space 54. The expansion portion 38 may include a toilet 80 and storage shelves 66.

The reader will appreciate that other configurations are possible within the scope of the patent and include, but are not limited to sinks, cooking facilities, sleeping structures, foldable tables and seating.

Figure 8:
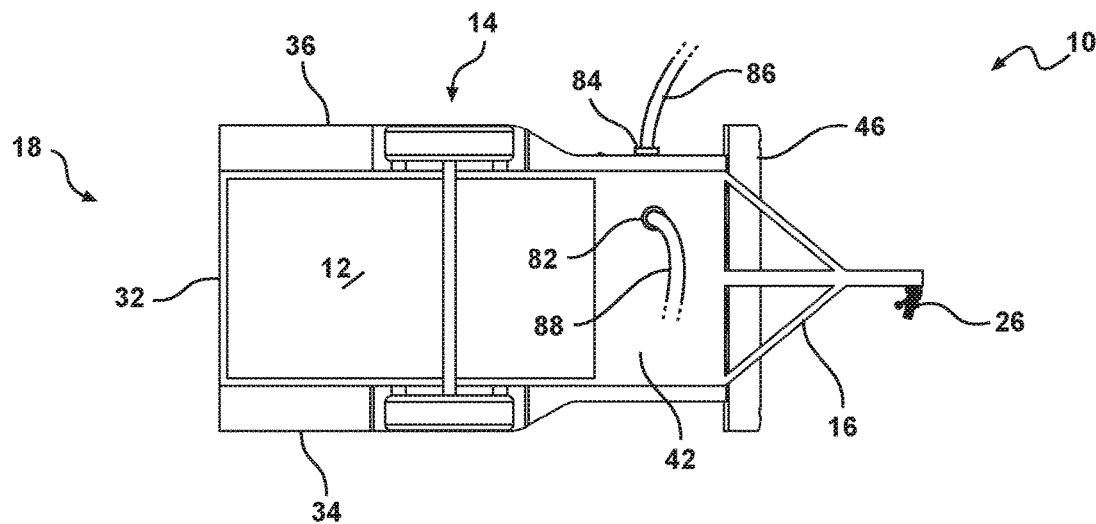
FIG. 8 is an underside view of the towable accommodation or storage assembly of FIG. 7.

As illustrated in FIG. 8, an exterior of the towable accommodation or storage assembly 10 includes appropriate plumbing and couplings 82, 84 for connection to inlet pipe 86 in fluid communication with a water source (not shown) and outlet pipe 88 for connection to a dump point (not shown). The couplings 82, 84 are preferably accessible from an exterior of the expansion portion and may include covers or caps (not shown) to protect them when not in use. In other embodiments, some of the coupling and a hot water system may be concealed behind the second floor portion 46 when it is in the raised position.

FIG. 9 illustrates the main roof 30 in a raised position and the walls 62, 64 and roof 60 attached or repositioned to at least partially enclose the expanded living space 44. A door 90 is located in wall 64 to permit access to the interior of the towable accommodation or storage assembly 10.

Figure 10:
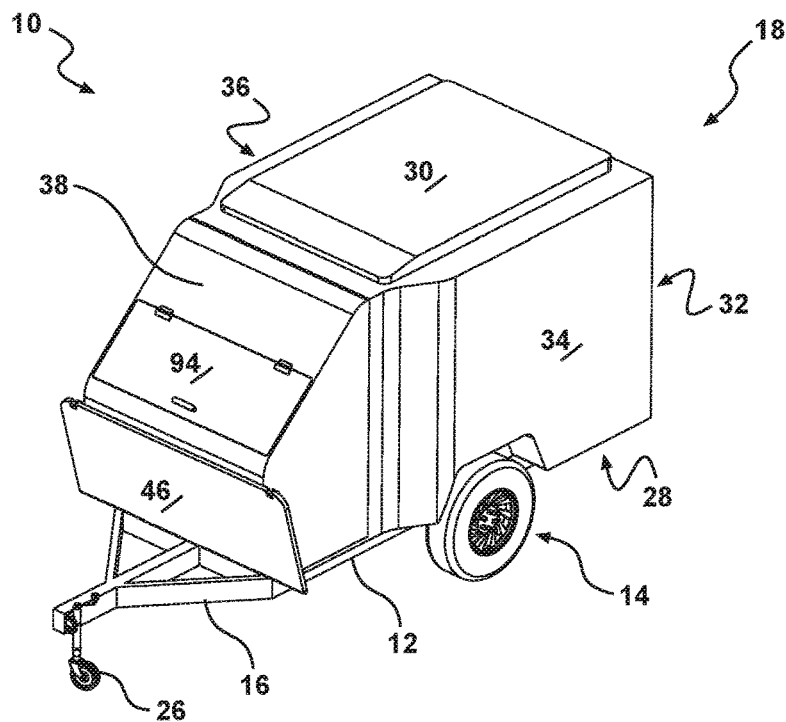
FIG. 10 is a perspective view of a fourth embodiment of the towable accommodation or storage assembly illustrating a front boot.

FIGS. 10 and 11 illustrate an upper front boot 92 with corresponding lid 94 and a lower storage area 96 that is sealed by the second floor portion 46, as shown in FIG. 10. The upper front boot 92 and lower storage area 96 include respective seals and latches (not shown).

Figure 12:
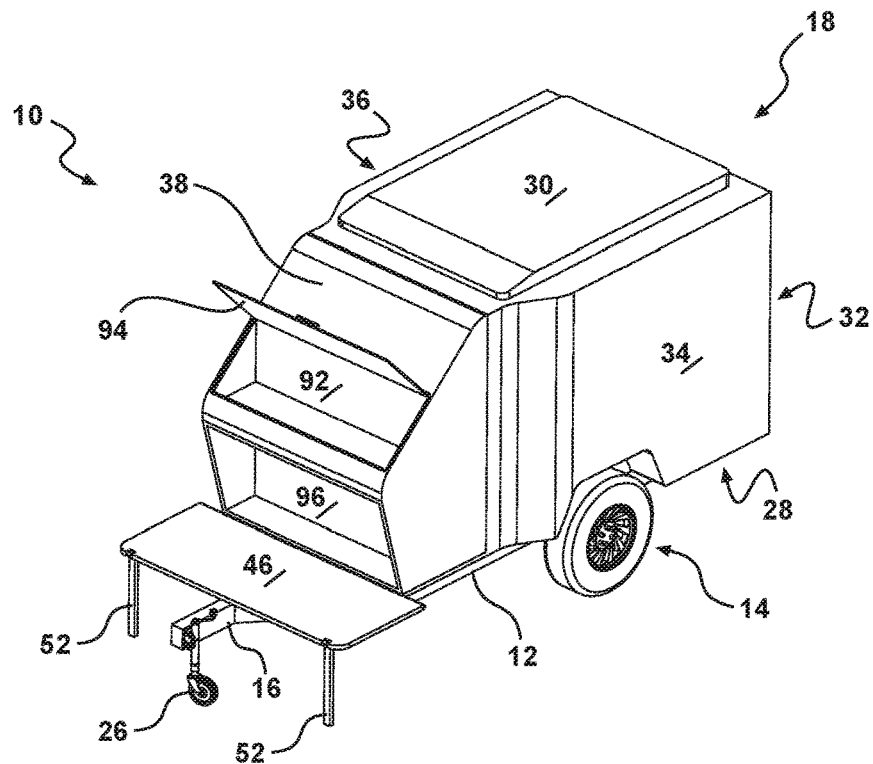
FIG. 12 is a side view of a fifth embodiment of the towable accommodation or storage assembly having dual axles.
Figure 12:
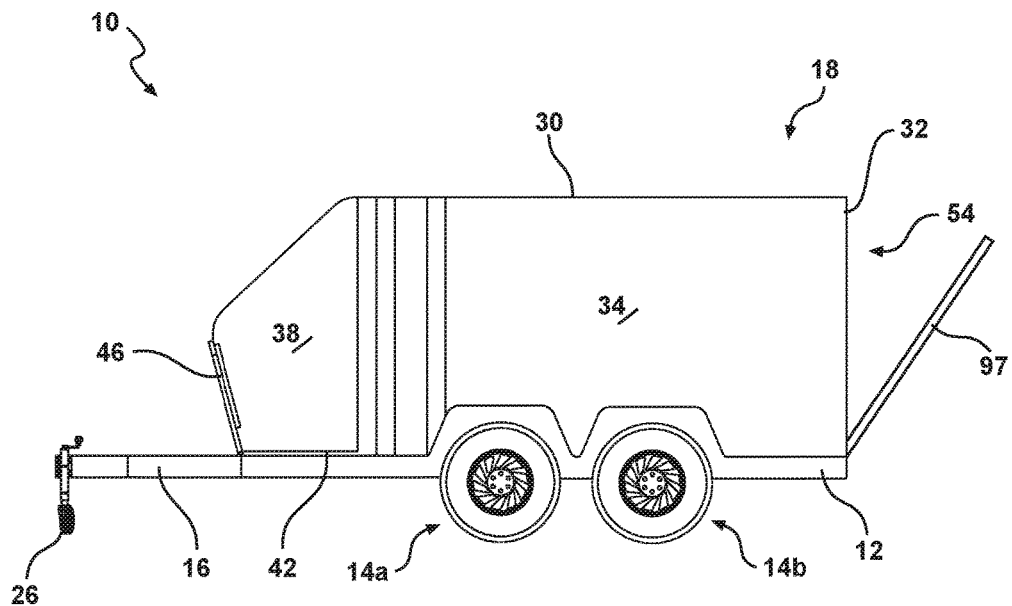

As illustrated in FIG. 12, in another embodiment the chassis 12 is supported on dual axles 14a, 14b and a door 97 is located in the rear wall 32 of the body 18 and used to form a ramp to assist in loading a vehicle such as a quad bike into the storage area 54.

Figure 13:
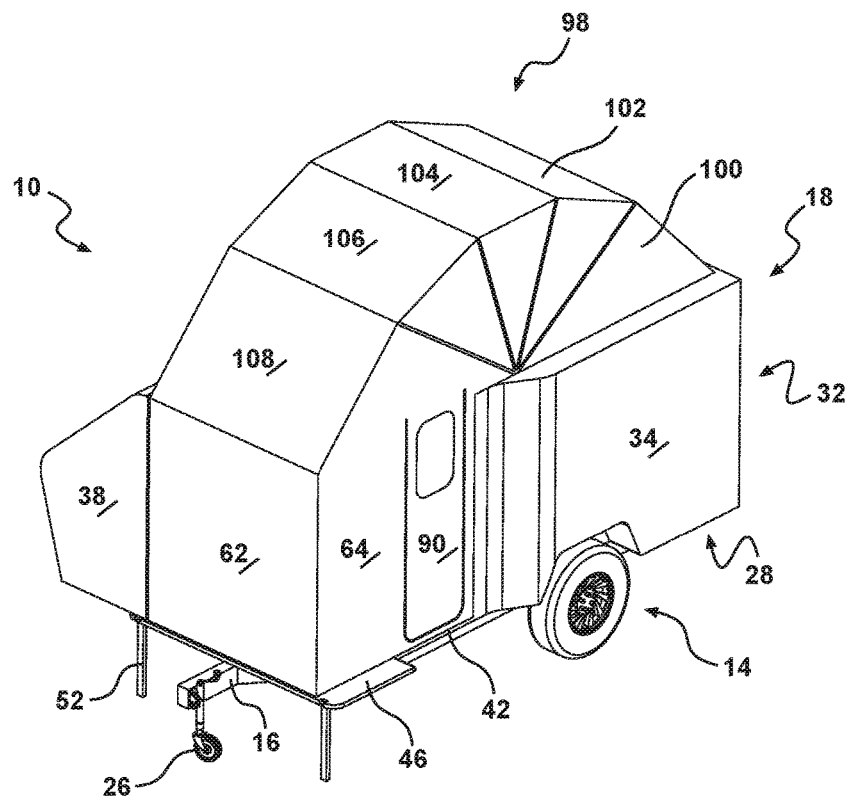
FIG. 13 is a perspective view of a sixth embodiment of the towable accommodation or storage assembly illustrating a foldable roof.

In another embodiment, as illustrated in FIG. 13 the main roof 30 and roof 60 may be replaced by a single segmented or expandable roof 98 that includes a plurality of segments 100, 102, 104, 106, 108, which are configured to cooperate to thereby form the roof of the towable accommodation or storage assembly 10 when expanded. The segments 100, 102, 104, 106, 108, may comprise a flexible roof with internal frame (not shown) or the segments may cooperate in such a way as to provide a barrier to the ingress of water and dust.

Figure 14:
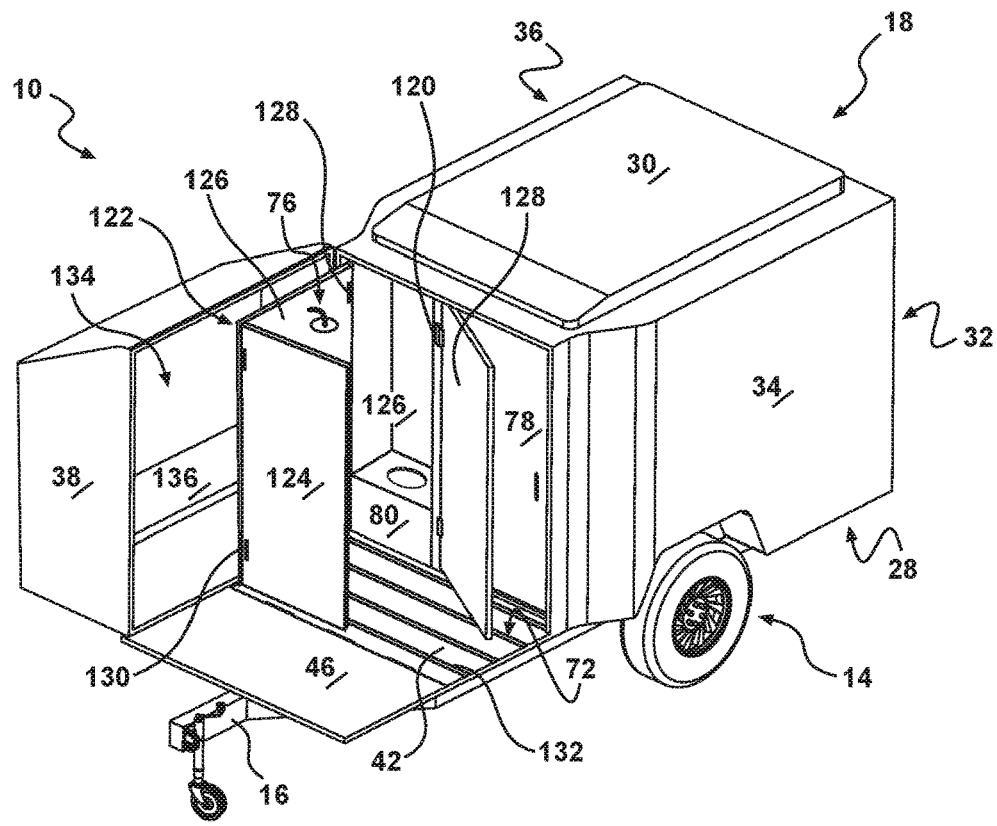
FIG. 14 is a perspective view of a seventh embodiment of the towable accommodation or storage assembly illustrating movable partitions.

Turning to FIGS. 14 to 16b there is illustrated another embodiment of the towable accommodation or storage assembly 10 that includes an ablutions cubicle 116 formed by movable partition walls 118, 122. As shown in FIG. 14 the pivoted wall portion 78 form a door that seals the internal living or storage space 54. This door 78 may include a lockable handle so that at least the internal living or storage space 54 can be locked up if the towable accommodation or storage assembly 10 is left unattended for a period of time. This would be particular relevant where the expanded living space 44 is at least partially constructed from canvas.

Figure 16A:
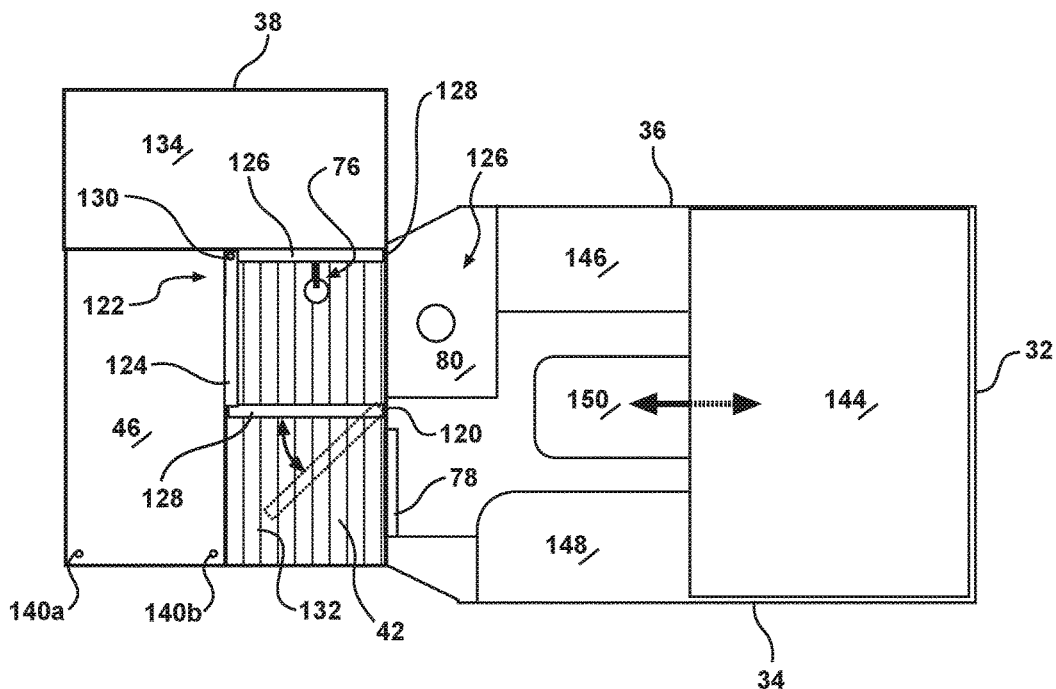
FIG. 16a is a top schematic view of the towable accommodation or storage assembly of FIG. 14 illustrating the partitions in a first position to thereby access the ablutions cubicle.

As further illustrated in FIG. 14 partition wall 118 is attached by hinges 120 and can be either positioned against door 78 when the expansion portion 38 is in the closed position or moved to a position where it forms one of the walls of the ablution cubicle 116, as illustrated in FIG. 16a. The partition wall 118 may also act as a door for providing access to the ablutions cubicle 116 and moved as indicated by the arrow and dotted lines of FIG. 16a.

The partition wall 122 in the present embodiment is bi-fold and includes panels 124, 126, hingedly attached by hinges 128 and 130.

The first floor portion 42 in the present embodiment is slatted and includes slots 132 that fluidly connect the upper surface of the first floor portion 42 with the collection tray/drain 72. The reader should appreciate that the second floor portion 46 may similarly be slatted.

The present embodiment includes a kitchen module 134 that is located within the expansion portion 38. The kitchen module 134 includes a bench 136 or preparation area and, although not illustrated, may include shelves, a fridge, microwave or other kitchen appliances or infrastructure.

Figure 15:
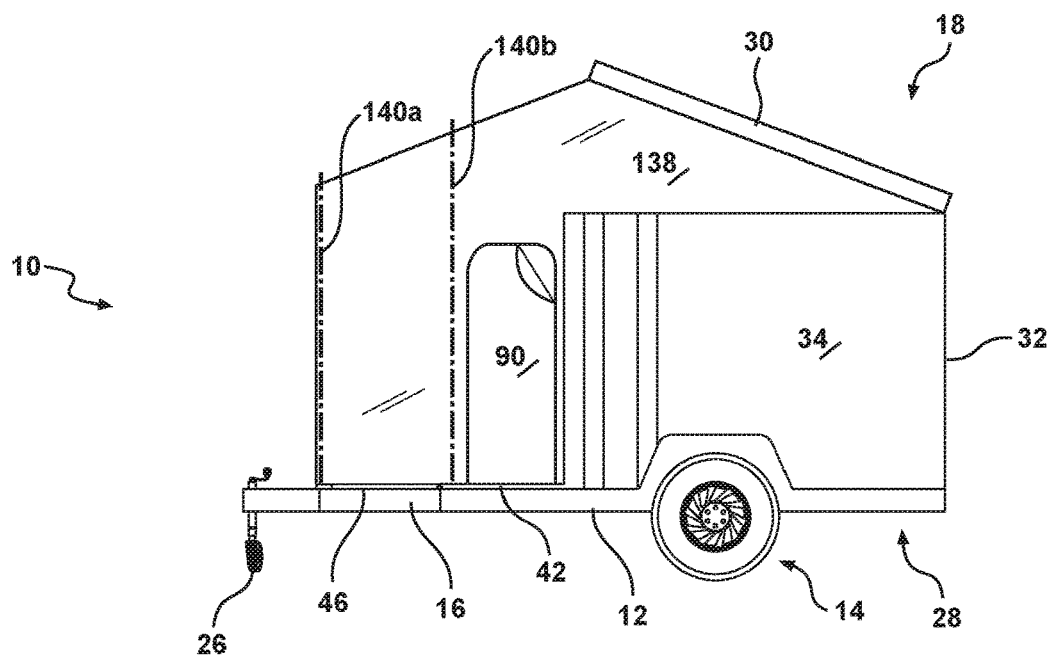
FIG. 15 is a side view of the towable accommodation or storage assembly of FIG. 14 with the roof lifted and a tent attached to encloses the expanded living area.

As illustrated in FIG. 15 the expanded living area 44 is enclosed by a flexible tent 138, such as, but not limited to canvas. The tent 138 is stored within a roof cavity (not shown) when not in used and when the roof 30 is lifted the tent 138 is pulled out and attached around an edge to the floor 42, 46, expansion portion 38 and wall 34 by way of zips, clips or other fastening devices. The tent 138 is supported by poles 140a, 140b and includes door 90.

Figure 16B:
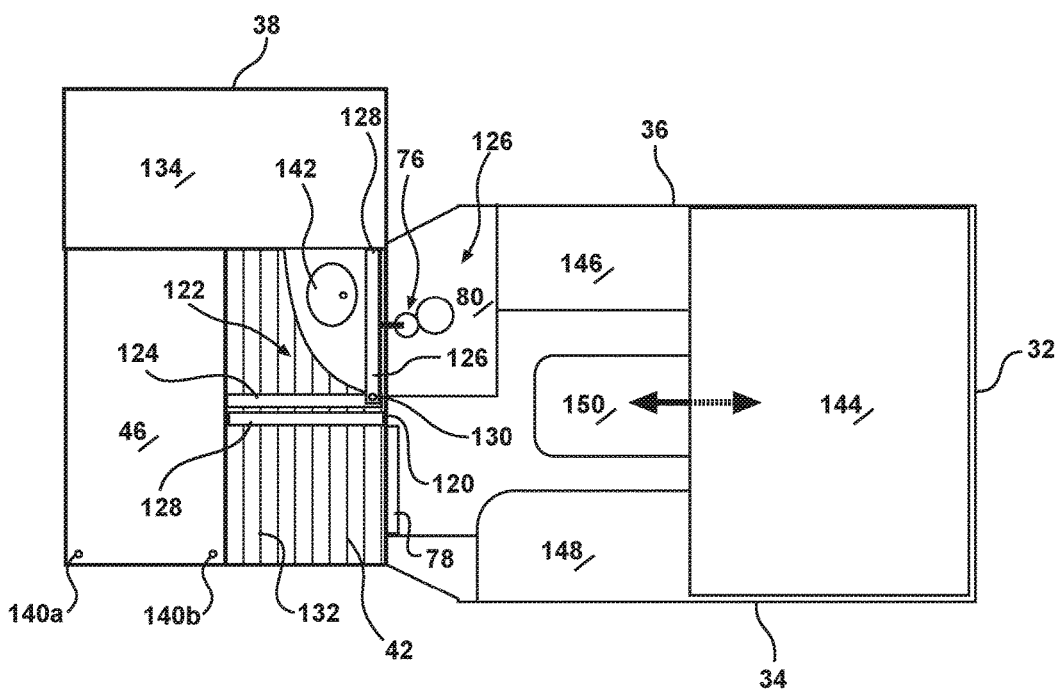
FIG. 16b is a top schematic view of the towable accommodation or storage assembly of FIG. 14 illustrating the partitions in a second position to thereby access the kitchen sink.

FIGS. 16a and 16b show two different top schematic views of the layout of the towable accommodation or storage assembly 10. In FIG. 16a the panels 124, 126 of the partition wall 122 are positioned so that a user can have full access to the ablutions cubicle 116. In this arrangement panel 126 abuts or at least conceals part of the kitchen 134. As further illustrated in FIG. 16a the partition wall 118 can be moved in the direct of the arrow to act as a door to provided assess to the toilet 80 and shower 76. Any water that falls onto the floor 42 passes through the slots 132 into the drain 72.

When the user wants full access to the kitchen 134, the panels 124, 126 of the partition wall 122 can be pivoted around hinges 128, 130 and repositioned into the arrangement as illustrated in FIG. 16b. In this configuration, a kitchen sink 142 that is attached to the rear side of panel 126 is exposed for use.

As further illustrated in FIGS. 16a, 16b the internal living space 54 may include a raised double bed 144 and benches 146, 148 at a lower level which extend under bed 144 and can be converted into individual single beds. A table 150 is locatable between the benches 146, 148 and can be slid under the bed 144 when not required as illustrated by the arrow in the figures.

Figure 17:
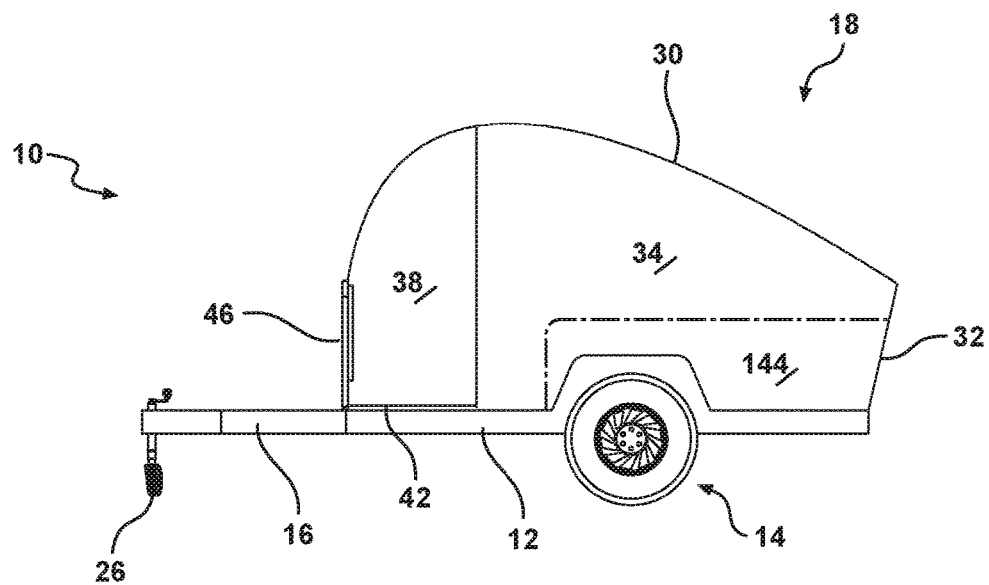
FIG. 17 is a side view of a seventh embodiment of the towable accommodation or storage assembly having a teardrop shape.
Figure 18:
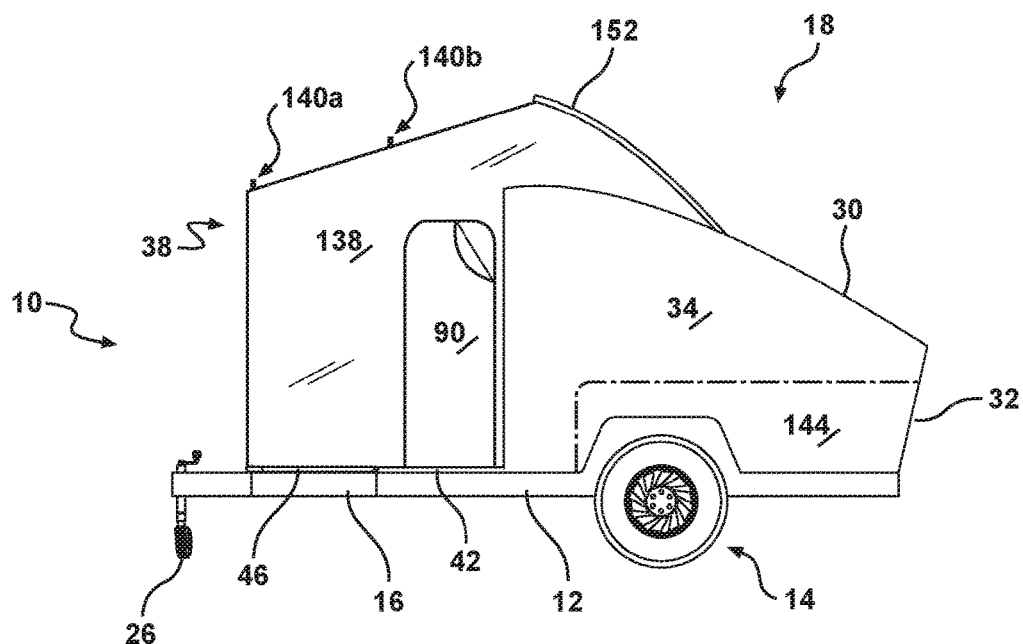
FIG. 18 is a side view of the towable accommodation or storage assembly of FIG. 17 with part of the roof lifted and tent attached.
Figure 19:
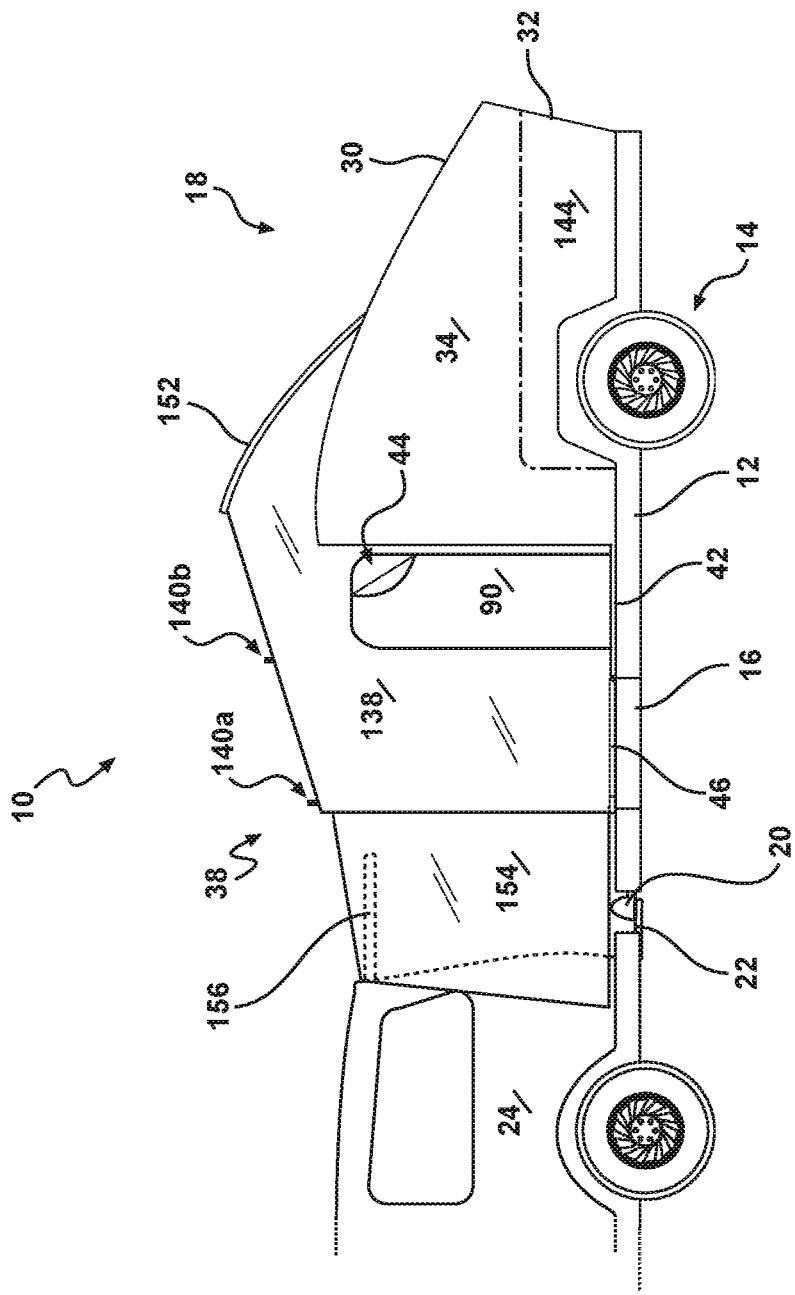
FIG. 19 is a side schematic view of the towable accommodation or storage assembly of FIG. 17 illustrating the use of an awning to connect the rear of the tow vehicle to the extended living space of the towable accommodation or storage assembly.

In another embodiment, as illustrated in FIGS. 17 to 19, there is provided what is commonly referred to as a tear drop camper configuration. Typically, in the prior art a tear drop camper will open rearwardly and the bed will be located at a front of the body. In the present invention, the bed 144 is located at a rear of the body 18, as illustrated in FIG. 17 and a portion 152 of the roof 30 is configured to open to provide access to the front of the body 18, as illustrated in FIG. 18.

The tent 138 can then be retrieved from within the roof cavity and be supported by poles 140a, 140b as previously discussed. The tent 138 may also include an awning 154 that extends outwardly or connects thereto as illustrated in FIG. 19. The awning 154 is connected to, or extends over, a rear of the towing vehicle 24. In this way, the towable accommodation or storage assembly 10 is connected directly to the towing vehicle 24 and the expanded living space 44 can act as a foyer or intermediate area between the towing vehicle 24 and the towable accommodation or storage assembly 10, thereby allowing covered access to the rear of the towing vehicle 24 through a window 156 or by opening the rear door of the vehicle 24. This is particularly beneficial if a bedding area, storage draws or a fridge are located in the rear of the vehicle 24.

Figure 20:
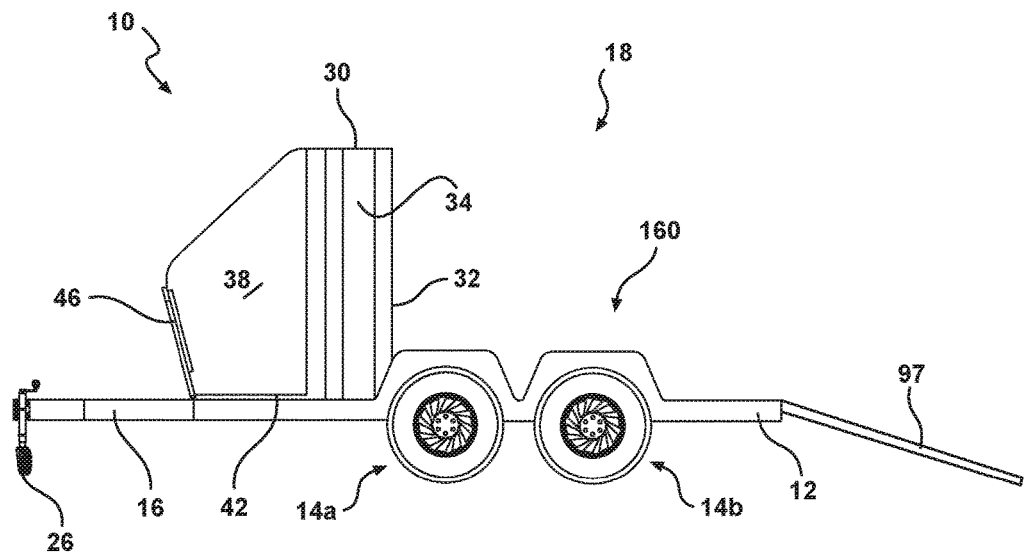
FIG. 20 is a side view of the towable accommodation unit illustrating a flatbed.

As illustrated in FIG. 20, the body 18 of the assembly 10 includes a rear flatbed portion 160. This flatbed portion 160 may be used to carry a recreational vehicle, such as a quad bike or dirt bike (not shown), wherein the ramp 97 can be utilized for loading and unloading of the recreational vehicle.

Figure 21:
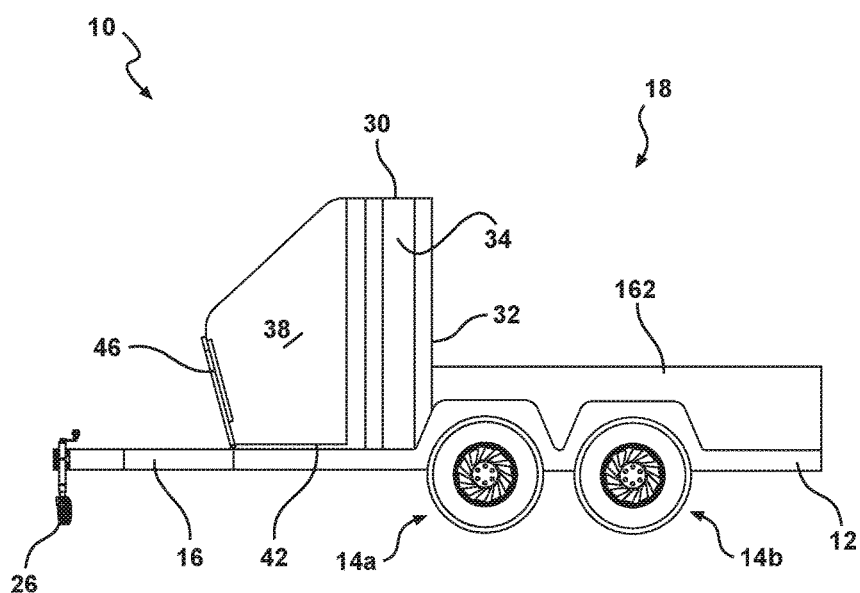
FIG. 21 is a side view of the towable accommodation unit illustrating a box tray.

In another embodiment, as illustrated in FIG. 21, the body 18 of the assembly 10 includes a box tray 162 for carry goods. For instance, the expansion portion 38 may contain the ablutions facilities, power storage batteries and/or kitchen equipment, while the box tray 162 can be used to transport tents, chairs, supplies and other camping equipment.

The skilled addressee will now appreciate the advantages of the illustrated invention over the prior art. In one form the invention provides a second floor portion that is fixed on its lower horizontal edge with a hinge so it can be lowered forwardly over the drawbar to thereby create a forward expanded floor area over space that is normally void due to the required towing vehicle's turning clearance. Accordingly, the present invention uses space that is typically not utilises in existing caravans, campers and the like.

The expansion portion 38 can be swung open to expand the footprint of the towable accommodation or storage assembly 10 to one side. The expansion portion 38 can also be partially opened to access the interior of the towable accommodation or storage assembly 10 such as at a roadside stop. Accordingly, the present invention provides benefits or at least a useful alternative to current caravan and camper configurations.

Various features of the invention have been particularly shown and described in connection with the exemplified embodiments of the invention, however it must be understood that these particular arrangements merely illustrate the invention and it is not limited thereto. Accordingly, the invention can include various modifications, which fall within the spirit and scope of the invention.

The invention claimed is:

1. A towable accommodation or storage assembly including:
   a chassis supported on at least two wheels connected to a respective axle or independent suspension, a drawbar, and a body generally rigidly mounted to said chassis, the towable accommodation or storage assembly being towable behind a towing vehicle, the body having spaced apart first and second sidewalls, a rear wall extending therebetween, a roof attached to upper parts of said sidewalls and rear wall, and a main floor attached to lower parts of said sidewalls and rear wall;
   an expansion portion, pivotably mounted to, or adjacent a generally vertical front edge of the first sidewall and pivotable to abut a generally vertical front edge of said second sidewall;
   a fixed first floor portion adjoining or extending outwardly of said main floor; and
   a movable second floor portion hingedly attached to a front edge of the first floor portion and pivotable about a generally horizontal axis between an upright or angled orientation and a generally horizontal orientation whereby it is supportable on or above said drawbar;
   wherein said expansion portion is configured to pivot about a generally vertical axis from a first position whereby the expansion portion abuts or is positioned adjacent said vertical front edge of the second sidewall and covers at least a part of the first floor portion, whereby said second floor portion is positionable in said raised position such that it abuts or is located adjacent a part of the expansion portion, and a second position wherein at least a part of the first floor portion is exposed and said second floor portion is positionable in said generally horizontal orientation on or above the drawbar to thereby provide at least a part of an expanded floor for an expanded living space and said expansion portion forms at least a first side wall of said expanded living space.

2. The towable accommodation or storage assembly in accordance with claim 1, wherein the expansion portion includes storage compartments and/or ablutions facilities that can be accessed when the expansion portion is in or adjacent the second position and can be concealed when said expansion portion is in said first position.

3. The towable accommodation or storage assembly in accordance with claim 1, wherein the expansion portion overlays the first floor portion when in said first position, to seal the first floor portion from the ingress of dust.

4. The towable accommodation or storage assembly in accordance with claim 1, wherein a front wall of the body or a portion thereof may be movable when the expansion portion is in said second position or between the first and second positions, to permit access between the expanded living space and the internal living or storage space.

5. The towable accommodation or storage assembly in accordance with claim 1, wherein generally rigid panels or a flexible material are used to form a roof, front wall and second side wall of the expanded living space.

6. The towable accommodation or storage assembly in accordance with claim 5, wherein the flexible material, is selected from a group including, canvas, PVC and ripstop nylon.

7. The towable accommodation or storage assembly in accordance with claim 5, wherein the expanded living space includes a frame or poles that are secured to, or support the roof, front wall and second side wall.

8. The towable accommodation or storage assembly in accordance with claim 5, wherein an awning, tunnel tent or gusset is used to connect the expanded living space with a rear internal space of said towing vehicle.

9. The towable accommodation or storage assembly in accordance with claim 2, wherein the fixed first floor portion and hinged second floor portion are generally planar and configured to be positioned on generally the same horizontal plane when being used for accommodation or utility purposes.

10. The towable accommodation or storage assembly in accordance with claim 9, wherein the expanded living space includes a kitchen area and/or ablutions area and/or sleeping area and/or dining area.

11. The towable accommodation or storage assembly in accordance with claim 10, further including a movable internal panel or movable internal panels that can be positioned to provide internal sidewall or sidewalls for said kitchen area and/or ablutions area and/or sleeping area and/or dining area.

12. The towable accommodation or storage assembly in accordance with claim 10, wherein movable internal panel or movable internal panels may provide access to a toilet and/or shower and/or sink or sinks.

13. The towable accommodation or storage assembly in accordance with claim 12, further including plumbing for the toilet and/or shower and/or sink or sinks and corresponding couplings for connection to a water source or tank or dumping point, whereby the couplings are accessible from an exterior of the expansion portion.

14. The towable accommodation or storage assembly in accordance with claim 1, wherein a flatbed or box tray is located rearward of said body and/or expansion portion, and is rigidly connected to said chassis.

15. The towable accommodation or storage assembly in accordance with claim 1, wherein at least some plumbing couplings and/or a storage area and/or a services area is/are concealed when the second floor portion is in the upright or angled orientation and abutting a side of the expansion portion.

16. The towable accommodation or storage assembly in accordance with claim 1, wherein the second floor portion acts as a stone guard when in the upright or angled orientation and being towed by the towing vehicle.

17. The towable accommodation or storage assembly in accordance with claim 1, wherein the first and/or second floor portions includes at least one part that is sloped or slatted to permit drainage into a drain pipe, sump or tank.

18. The towable accommodation or storage assembly in accordance with claim 1, wherein a door is located in at least one of the walls of the expanded living space to allow access thereto.

19. The towable accommodation or storage assembly in accordance with claim 1, wherein stabilising legs or struts are used to support at least a part of the expansion portion or first floor portion or second floor portion.

20. A method of providing an expandable portable living space, including the steps of:
 providing a towable accommodation or storage assembly including a chassis supported on at least two wheels connected to a respective axle or independent suspension, a drawbar for coupling to a towing vehicle for transportation thereof, a body generally rigidly mounted to said chassis, an expansion portion pivotably mounted to, or adjacent said body, a floor portion mounted to, or supported on, an upper surface of said drawbar, and a movable second floor portion hingedly attached to a front edge of the first floor portion and pivotable about a generally horizontal axis between an upright or angled orientation and a generally horizontal orientation whereby it is supportable on or above said drawbar;
 towing said towable accommodation or storage assembly with the expansion portion in a retracted position, to a lodging site;
 pivoting the second floor portion from the upright or angled orientation downwardly into said generally horizontal orientation;
 pivoting said expansion portion about a generally vertical axis into an extended position thereby exposing or positioning said first and second floor portions to provide an expanded floor for an expanded living space, the expansion portion forming at least one wall of said expanded living space; and
 attached or positioning a roof and walls in place to thereby at least partially enclose said expanded living space.

\* \* \* \* \*